(12) United States Patent
Civil et al.

(10) Patent No.: US 9,344,323 B2
(45) Date of Patent: May 17, 2016

(54) G.8032 ETHERNET MULTIPLE FAULT RECOVERY MECHANISMS

(71) Applicants: Geraldine Ruth Civil, Nepean (CA); Marc Holness, Nepean (CA)

(72) Inventors: Geraldine Ruth Civil, Nepean (CA); Marc Holness, Nepean (CA)

(73) Assignee: Ciena Corporation, Hanover, MD (US)

( * ) Notice: Subject to any disclaimer, the term of this patent is extended or adjusted under 35 U.S.C. 154(b) by 85 days.

(21) Appl. No.: 14/161,776

(22) Filed: Jan. 23, 2014

(65) Prior Publication Data

US 2015/0207668 A1 Jul. 23, 2015

(51) Int. Cl.
*H04L 12/24* (2006.01)
*H04L 12/437* (2006.01)
*H04L 12/46* (2006.01)
*H04L 29/14* (2006.01)
*H04L 12/703* (2013.01)
*H04L 12/413* (2006.01)
*H04L 12/26* (2006.01)
*H04L 12/42* (2006.01)

(52) U.S. Cl.
CPC .......... *H04L 41/0654* (2013.01); *H04L 12/413* (2013.01); *H04L 12/437* (2013.01); *H04L 12/4637* (2013.01); *H04L 29/14* (2013.01); *H04L 41/0659* (2013.01); *H04L 45/28* (2013.01); *H04L 43/0811* (2013.01); *H04L 2012/421* (2013.01)

(58) Field of Classification Search
CPC ............ H04L 41/0654; H04L 43/0811; H04L 41/0659; H04L 12/437; H04L 12/4637; H04L 29/14; H04L 2012/421
See application file for complete search history.

(56) References Cited

U.S. PATENT DOCUMENTS

| 7,103,807 | B2 * | 9/2006 | Bosa et al. ...................... 714/43 |
| 7,499,407 | B2 | 3/2009 | Holness et al. |
| 7,505,466 | B2 | 3/2009 | Rabie et al. |
| 7,633,968 | B2 | 12/2009 | Haran et al. |
| 8,018,841 | B2 | 9/2011 | Holness et al. |
| 8,144,586 | B2 | 3/2012 | McNaughton et al. |
| 8,149,692 | B2 | 4/2012 | Holness et al. |
| 8,305,938 | B2 | 11/2012 | Holness et al. |

(Continued)

FOREIGN PATENT DOCUMENTS

EP 1575221 A1 9/2005

OTHER PUBLICATIONS

Recommendation ITU-T G.8032/Y.1344, Ethernet ring protection switching, Jun. 2008.

(Continued)

*Primary Examiner* — Mohammad Anwar
(74) *Attorney, Agent, or Firm* — Clements Bernard PLLC; Christopher L. Bernard; Lawrence A. Baratta, Jr.

(57) ABSTRACT

A method, network element, and network provide detecting a failure on both ports of a major ring at a network element that has an interconnecting sub-ring terminating thereon; causing a block at an associated sub-ring termination port of the interconnecting sub-ring responsive to the failure on both the ports of the major ring; and monitoring the failure and clearing the block responsive to a recovery of one or both ports from the failure. The method, network, and network element include G.8032 multiple concurrent or simultaneous fault recovery mechanisms that traffic being transported between an interconnected major ring and a sub-ring to be successfully delivered in the event of dual concurrent faults on the major ring.

19 Claims, 12 Drawing Sheets

(56) References Cited

U.S. PATENT DOCUMENTS

| | | |
|---|---|---|
| 8,509,061 B2 | 8/2013 | Holness et al. |
| 8,588,060 B2 | 11/2013 | Holness |
| 8,625,410 B2 | 1/2014 | Abdullah et al. |
| 2005/0207348 A1* | 9/2005 | Tsurumi ............... H04L 12/437 370/241 |
| 2007/0268817 A1 | 11/2007 | Smallegange et al. |
| 2009/0175176 A1 | 7/2009 | Mohan |
| 2010/0135291 A1 | 6/2010 | Martin et al. |
| 2010/0177635 A1 | 7/2010 | Figueira |
| 2010/0250733 A1 | 9/2010 | Turanyi et al. |
| 2010/0260196 A1 | 10/2010 | Holness et al. |
| 2010/0260197 A1 | 10/2010 | Martin et al. |
| 2010/0284413 A1 | 11/2010 | Abdullah et al. |
| 2011/0110359 A1* | 5/2011 | Cooke et al. ................. 370/350 |
| 2012/0033666 A1 | 2/2012 | Holness et al. |
| 2012/0106360 A1 | 5/2012 | Sajassi et al. |
| 2012/0147735 A1* | 6/2012 | Wang et al. .................. 370/217 |
| 2012/0155246 A1* | 6/2012 | Wang ................... H04L 12/437 370/217 |
| 2012/0195233 A1* | 8/2012 | Wang et al. .................. 370/258 |
| 2012/0224471 A1 | 9/2012 | Vinod et al. |
| 2012/0230214 A1 | 9/2012 | Kozisek et al. |
| 2012/0243405 A1 | 9/2012 | Holness et al. |
| 2012/0250695 A1 | 10/2012 | Jia et al. |
| 2012/0281710 A1 | 11/2012 | Holness et al. |
| 2013/0258840 A1 | 10/2013 | Holness et al. |

OTHER PUBLICATIONS

Recommendation ITU-T G.8032/Y.1344, Ethernet ring protection switching, Mar. 2010.

Marc Holness, G.8032 Ethernet Ring Protection Overview, Mar. 2008 ITU-T Q9—SG 15.

Marc Holness, ITU-T G-Series Supplement 52 Overview, G.8032 Usage and Operational Considerations, Joint IEEE-SA and ITU Workshop on Ethernet, Geneva, Switzerland, Jul. 13, 2013.

Jeong-Dong Ryoo et al., Ethernet Ring Protection for Carrier Ethernet Networks, IEEE Communications Magazine • Sep. 2008.

Marc Holness, Metro Ethernet—History and Overview, The Greater Chicago Chapter SCTE, May 22, 2013.

Apr. 9, 2015 International Search Report issued in International Patent Application PCT/US2014/072940.

"Ethernet ring protection switching," International Telecommunication Union, G.8032/Y.1344 (Feb. 2012), pp. 1-104.

\* cited by examiner

G.8032 ETHERNET MULTIPLE FAULT RECOVERY MECHANISMS

FIELD OF THE DISCLOSURE

The present disclosure relates generally to communication networks. More particularly, the present disclosure relates to under G.8032 "Ethernet ring protection switching" (G.8032v1-2008, and G.8032v2-2010) multiple fault recovery mechanisms.

BACKGROUND OF THE DISCLOSURE

The Ethernet Ring Protection Switching (ERPS) protocol is an industry standard and is specified within International Telecommunication Union ITU SG15 Q9, under G.8032 "Ethernet ring protection switching" (G.8032v1-2008, and G.8032v2-2010), the contents of which are incorporated by reference. ERPS specifies protection switching mechanisms and a protocol for Ethernet layer network (ETH) rings. Each Ethernet Ring Node is connected to adjacent Ethernet Ring Nodes participating in the same Ethernet Ring, using two independent links. A ring link is bounded by two adjacent Ethernet Ring Nodes, and a port for a ring link is called a ring port. The minimum number of Ethernet Ring Nodes in an Ethernet Ring is two. Two fundamental principles of G.8032 include a) loop avoidance and b) utilization of learning, forwarding, and Filtering Database (FDB) mechanisms defined in the Ethernet flow forwarding function (ETH_FF). Loop avoidance in an Ethernet Ring is achieved by guaranteeing that, at any time, traffic may flow on all but one of the ring links. This particular link is called the Ring Protection Link (RPL), and under normal conditions this ring link is blocked, i.e. not used for service traffic. One designated Ethernet Ring Node, the RPL Owner Node, is responsible for blocking traffic at one end of the RPL. Under an Ethernet ring failure condition, the RPL Owner Node is responsible for unblocking its end of the RPL (unless the RPL has failed) allowing the RPL to be used for traffic. The other Ethernet Ring Node adjacent to the RPL, the RPL Neighbor Node, may also participate in blocking or unblocking its end of the RPL. The event of an Ethernet Ring failure results in protection switching of the traffic. This is achieved under the control of the ETH_FF functions on all Ethernet Ring Nodes. An Automatic Protection Switching (APS) protocol is used to coordinate the protection actions over the ring.

G.8032v2 introduced additional features, such as: multi-ring/ladder network support; revertive/non-revertive mode after condition, that is causing the switch, is cleared; administrative commands: Forced Switch (FS), Manual Switch (MS) for blocking a particular ring port; flush FDB (Filtering database) logic, which significantly reduces amount of flush FDB operations in the ring; and support of multiple ERP instances on a single ring. With respect to multi-ring/ladder network support, G.8032 specifies support for a network of interconnected rings. The recommendation defines basic terminology for interconnected rings including interconnection nodes, major ring, and sub-ring. Interconnection nodes are ring nodes that are common to both interconnected rings. The major ring is an Ethernet ring that controls a full physical ring and is connected to the Interconnection nodes on two ports. The sub-ring is an Ethernet ring that is connected to a major ring at the interconnection Nodes. By itself, the sub-ring does not constitute a closed ring and is closed through connections to the interconnection nodes. In interconnected rings, G.8032 was not designed nor specified to gracefully handle (i.e., recover) concurrent or simultaneous multiple faults on the major ring. Whenever a [single] fault occurs on a network element blade, which is supporting ring links; there is the potential for end-to-end network "black holing" of [client] traffic being transported by G.8032 ring interconnections. This leads to increases in service unavailability and dissatisfaction of customers due to network impairments.

BRIEF SUMMARY OF THE DISCLOSURE

In an exemplary embodiment, a method include detecting a failure on both ports of a major ring at a network element that has an interconnecting sub-ring terminating thereon; causing a block at an associated sub-ring termination port of the interconnecting sub-ring responsive to the failure on both the ports of the major ring; and monitoring the failure and clearing the block responsive to a recovery of one or both ports from the failure. The block causes the failure on the major ring to be visible on the interconnecting sub-ring for implementing G.8032 Ethernet Ring Protection Switching thereon. The method can further include implementing G.8032 Ethernet Ring Protection Switching in the major ring responsive to the failure. The method can further include implementing G.8032 protection in the interconnecting sub-ring responsive to the block. The method can further include monitoring virtual local area network (VLAN) membership between the major ring and interconnecting sub-ring with the block thereon; and, responsive to a change in the VLAN membership such that the major ring and the interconnecting sub-ring are no longer interconnected, releasing the block. The both ports of the major ring at the network element can be contained in a same module. The method can further include causing the block through one of a forced switch or manual switch applied to the associated sub-ring termination port or administratively disabling the associated sub-ring termination port.

In another exemplary embodiment, a network element includes a west major ring port and an east major ring port each associated with a major ring; a sub-ring termination port associated with a sub-ring interconnected with the major ring; and circuitry configured to: detect a failure affecting both the west major ring port and the east major ring port; cause a block at the sub-ring termination port; and monitor the failure and clear the block responsive to a recovery of one or both of the west major ring port and the east major ring port from the failure. The block causes the failure on the major ring to be visible on the interconnecting sub-ring for implementing G.8032 Ethernet Ring Protection Switching thereon. The circuitry can be further configured to implement G.8032 Ethernet Ring Protection Switching in the major ring responsive to the failure. The sub-ring can be configured to implement G.8032 Ethernet Ring Protection Switching responsive to the block. The circuitry can be further configured to monitor virtual local area network (VLAN) membership between the major ring and interconnecting sub-ring with the block thereon; and, responsive to a change in the VLAN membership such that the major ring and the interconnecting sub-ring are no longer interconnected, release the block. The network element can include an interconnection node. The block can be caused through one of a forced switch or manual switch applied to the sub-ring termination port or administratively disabling the sub-ring termination port.

In yet another exemplary embodiment, a network includes a major ring including a first interconnection node and a second interconnection node; and a sub-ring interconnected to the major ring through the first interconnection node and the second interconnection node; wherein, responsive to a multiple concurrent failure at one of the first interconnection node and the second interconnection node affecting traffic between the major ring and the sub-ring, the one of the first interconnection node and the second interconnection node is configured to cause a block on a port terminating the sub-ring. The block causes the multiple concurrent failure on the major ring to be visible on the sub-ring for implementing G.8032 Ethernet Ring Protection Switching thereon. Responsive to the multiple concurrent failure, the major ring can be configured to implement G.8032 Ethernet Ring Protection Switching. Responsive to the multiple concurrent failure and the block, the sub-ring can be configured to implement G.8032 Ethernet Ring Protection. The one of the first interconnection node and the second interconnection node is configured to monitor virtual local area network (VLAN) membership between the major ring and sub-ring with the block thereon; and, responsive to a change in the VLAN membership such that the major ring and the sub-ring are no longer interconnected, release the block. The block can be caused through one of a forced switch or manual switch applied to the port terminating the sub-ring or administratively disabling the port terminating the sub-ring.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, G.8032 multiple concurrent fault recovery mechanisms are disclosed that allow [client] traffic being transported between an interconnected major ring and a sub-ring to be successfully delivered in the event of dual concurrent or simultaneous faults on the interconnection node of the major ring. Advantageously, the G.8032 multiple concurrent fault recovery mechanisms improve a Service Provider's network and service availability when G.8032 (ring interconnections) is being used to transport client traffic. Although G.8032 was specified/defined to provide resiliency for single fault scenarios only, a [single] network element blade (e.g., line module, card, blade, etc.) fault can actually result in multiple faults on a ring (e.g., ring east and west port). From a technical protocol perspective, this is a multiple failure scenario, however, from a customer perspective this is a single fault scenario, i.e. a single failed module. The G.8032 multiple concurrent fault recovery mechanisms addresses the Service Provider's (network) perspective.

Figure 1:
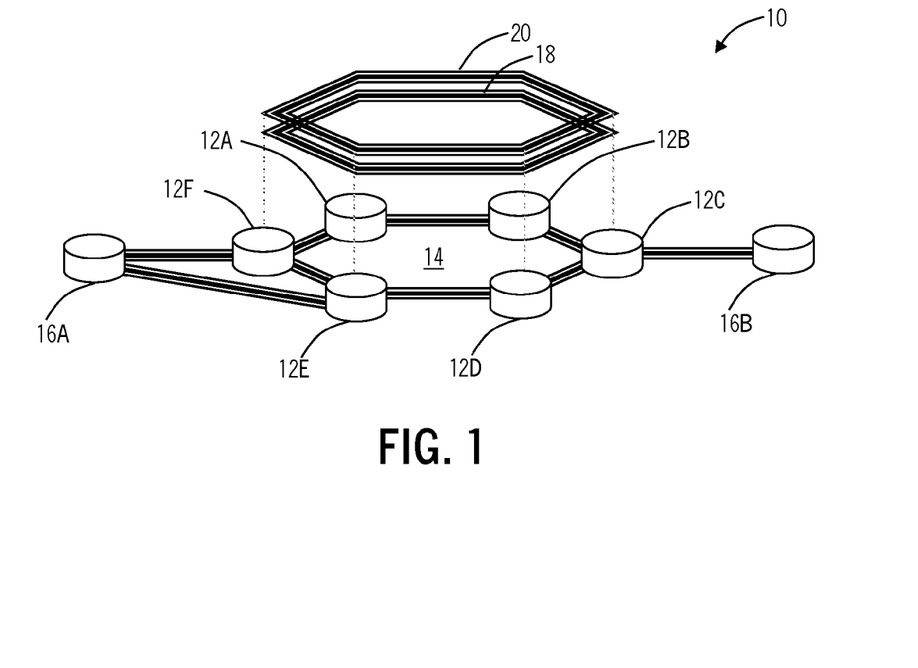
FIG. 1 is a network diagram of a network of network elements in a ring providing Ethernet Ring Protection.

Referring to FIG. 1, in an exemplary embodiment, a network 10 is illustrated of network elements 12A-12F (collectively referred to herein as network elements 12) in a ring 14 providing Ethernet Ring Protection. Also, the network 10 may include network elements 16A, 16B interconnected via the ring 14. The network elements 12, 16A, 16B may include optical switches, optical cross-connects, SONET/SDH devices with layer two traffic, Optical Transport Network (OTN) switches with layer two traffic, Ethernet switches, routers, or any other device commonly known to forward data packets in a network. The network elements 12 are physically configured in a ring topology and the ring 14 is a logical construct that forms a closed loop over the physical network infrastructure. The network elements 12 may utilize G.8032 Ethernet Ring Protection Switching over the ring 14 to provide rapid protection switching below 50 ms. Advantageously using G.8032, the ring 14 and the network elements 12 may be client and server layer agnostic while using existing (and commodity) IEEE 802.1 (bridging) and IEEE 802.3 (MAC) hardware. Connections between adjacent network elements 12 in the ring 14 (i.e., the ring spans) are assumed to be bi-directional, and may be a link, a link aggregation group, or a subnet (e.g., Multiprotocol Label Switching (MPLS), Provider Backbone Bridge Traffic Engineering (PBB-TE), SONET/SDH, OTN, etc.). Also, the ring spans associated with the ring 14 need not be the same bandwidth nor server layer technology. In Ethernet Ring Protection Switching, a "virtual ring" (VRing) is associated with the ring 14 and each VRing includes two channels 18, 20—an R-APS channel 18 used for transport of ring control Protocol Data Units (PDUs) and a service data channel 20 used for transport of client data traffic.

Figure 2:
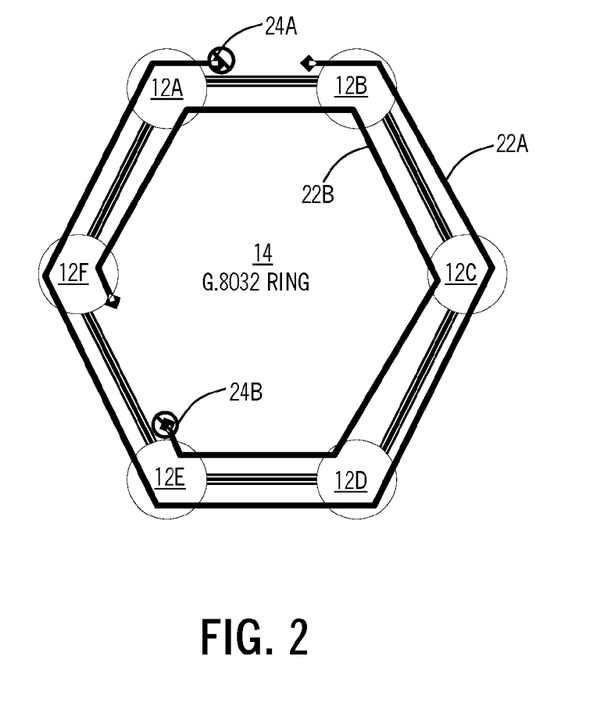
FIG. 2 is a network diagram of the ring of FIG. 1 with two virtual rings (VRings) provisioned thereon.

Referring to FIG. 2, in an exemplary embodiment, the ring 14 is illustrated with two VRings 22A, 22B provisioned thereon. Each of the VRings 22A, 22B has a service data channel 20 providing client traffic flows over the ring 14 that share a common provisioned channel block. Also, each client micro traffic flow may have a Virtual Local Area Network (VLAN) associated with it. Also, the multiple VRings 22A, 22B on a given Ring cannot have an overlapping VLAN Identification (VID) space. Each of the VRings 22A, 22B also includes a channel block 24A, 24B (collectively referred to herein as a channel block 24) that prevents VLAN tagged traffic from being relayed/forwarded between [ring or client] ports. Thus, each of the VRings 22A, 22B includes an R-APS channel 18 and a service data channel 20. Each channel 18, 20 needs at least a single channel blocking point on the ring 14, i.e. the channel block 24A, 24B. Using Ethernet Ring Protection, there is a central node called the Ring Protection Link (RPL) owner node which blocks, using the channel block 24, one of the ports, known as the RPL port, to ensure that no loop forms for the Ethernet traffic. Ring Automated Protection Switching (R-APS) messages are used to coordinate the activities of switching the RPL link on or off. Ethernet Shared Protection Ring (E-SPRing) is one instantiation, i.e. one embodiment, of the ERP standard.

Figure 3:
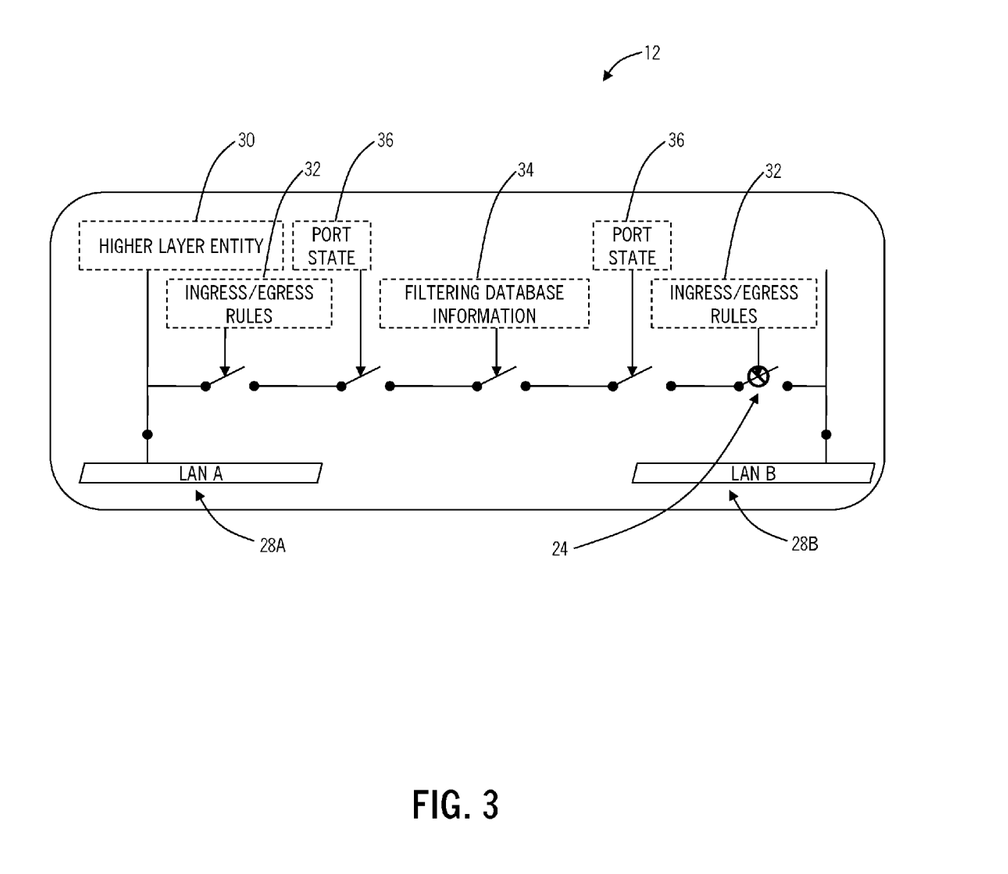
FIG. 3 is a functional block diagram of an exemplary channel block in a network element.

Referring to FIG. 3, in an exemplary embodiment, a functional block diagram illustrates an exemplary channel block 24 in the network element 12. The network element 12 is illustrated with two exemplary ports 28A, 28B (referred to a LAN A and LAN B). The network element 12 may include higher level entities 30, ingress/egress rules 32, port state 34, and a filtering database information 36. The channel block 24 function prevents traffic from being forwarded by the receive ring port. However, it does not prevent traffic from being received by the higher level entities 30 (e.g., G.8032 Engine) on the network element 12. In an exemplary embodiment, the channel block 24 may be realized by ingress/egress rules 34 placed on a [virtual] ring port 28. The following Channel block rules should be applied such that each of the channels 18, 20 must have at least a [single] channel block 24 installed (at all times) and the location of the "provisioned" channel block 24 (associated with the Ring Protection Link) is [currently] operator determined.

Figure 4:
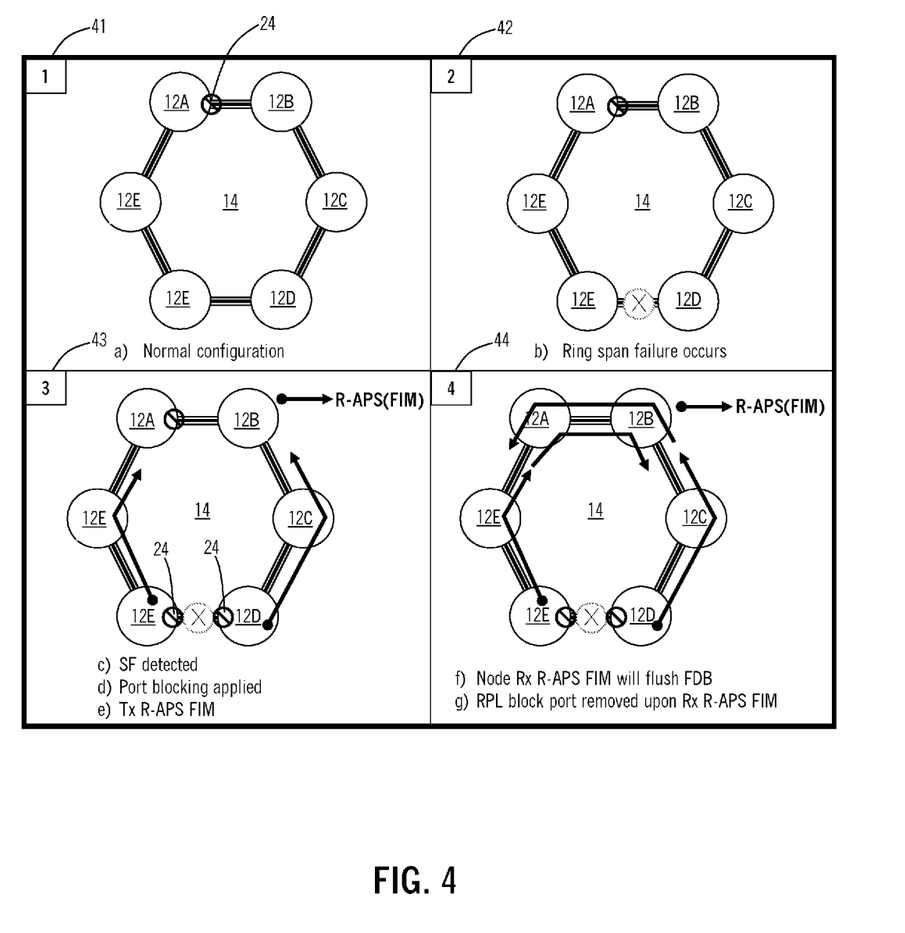
FIG. 4 is a network diagram of the ring of FIG. 1 showing a failure sequence using G.8032 Ethernet Ring Protection on the network elements.

Referring to FIG. 4, in an exemplary embodiment, the ring 14 is illustrated showing a failure sequence using G.8032 Ethernet Ring Protection on the network elements 12. At a first point 41 in FIG. 4, the ring 14 is operating under a normal configuration, i.e. no failures. In this example, the channel block 24 is at the network element 12A facing the network element 12B. At a point 42, a failure occurs on a ring span between the network elements 12E, 12D. At a point 43, a signal failure (SF) is detected on the ring, port blocking is applied at the network elements 12E, 12D via channel blocks 24, and R-APS Failure Indication Messages (FIM) are transmitted. At a point 44, each of the network elements 12 will receive the R-APS FIM and flush their current Forwarding Database (FDB) and the channel block 24 will be removed at the network element 12A upon receipt of the R-APS FIM. The FDB includes information which contains the routing configuration from the point of view of the current network element. Under G.8032, general protocol guidelines used to support protection switching within 50 ms are 1) Time for a R-APS message to circulate an entire ring (i.e., ring circumference and nodal transit delays) should be ≤10 ms, 2) Time taken to install channel blocks should be ≤15 ms, 3) Time taken to cleanse stale entries found in the FDB associated with Ring should be ≤10 ms, and 4) Time taken to remove channel blocks should be ≤15 ms.

Figure 5:
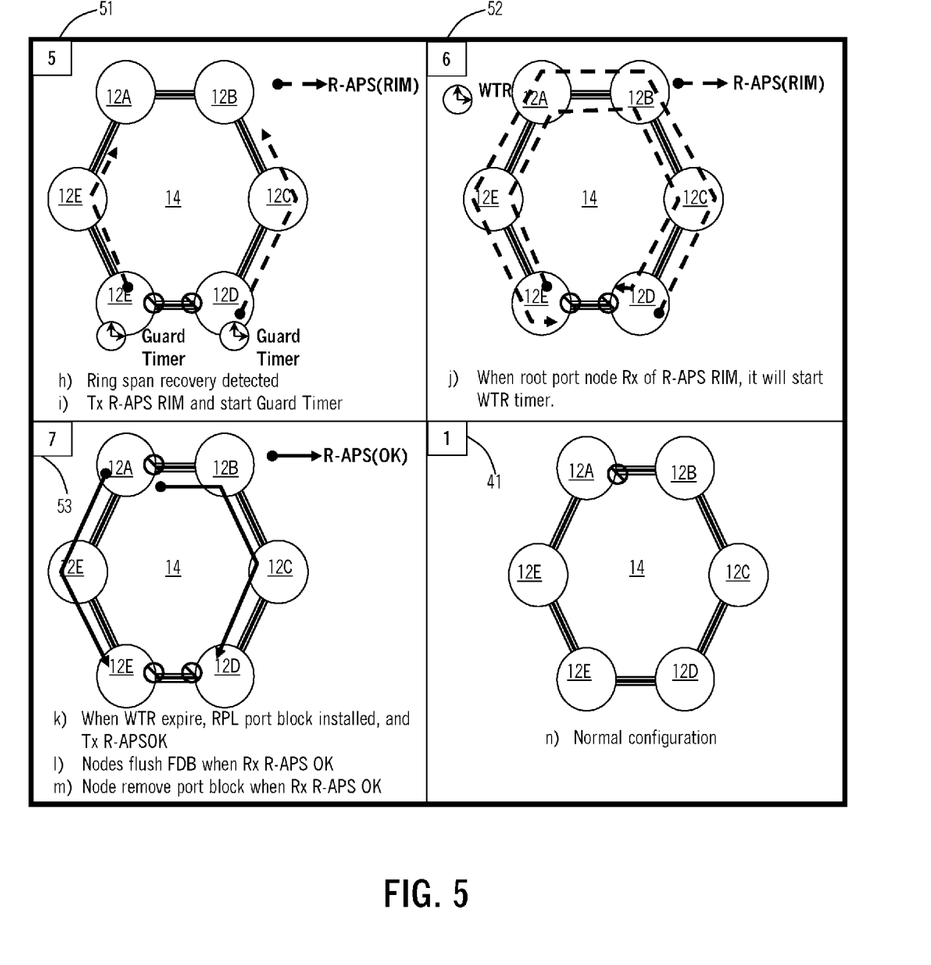
FIG. 5 is a network diagram of the ring of FIG. 1 showing a recovery sequence using G.8032 Ethernet Ring Protection on the network elements.

Referring to FIG. 5, in an exemplary embodiment, the ring 14 is illustrated showing a recovery sequence using G.8032 Ethernet Ring Protection on the network elements 12. The recovery sequence includes a recovery from the failure illustrated in FIG. 4 between the network elements 12D, 12E. At a point 51, a ring span recovery is detected between the network elements 12D, 12E and R-APS Recovery Indication Messages (RIM) are transmitted along with guard timers started at the network elements 12D, 12E. At a point 52, when a root port node receives the R-APS RIM, a wait-to-restore (WTR) timer is started. At a point 53, when the WTR expires, the RPL port block is installed at the network element 12A and R-APS OK messages are transmitted. Also, each of the network elements 12 flush their FDB when the R-APS OK messages are received as well as removing port block such as at the network elements 12D, 12E when the R-APS OK messages are received.

Figure 6:
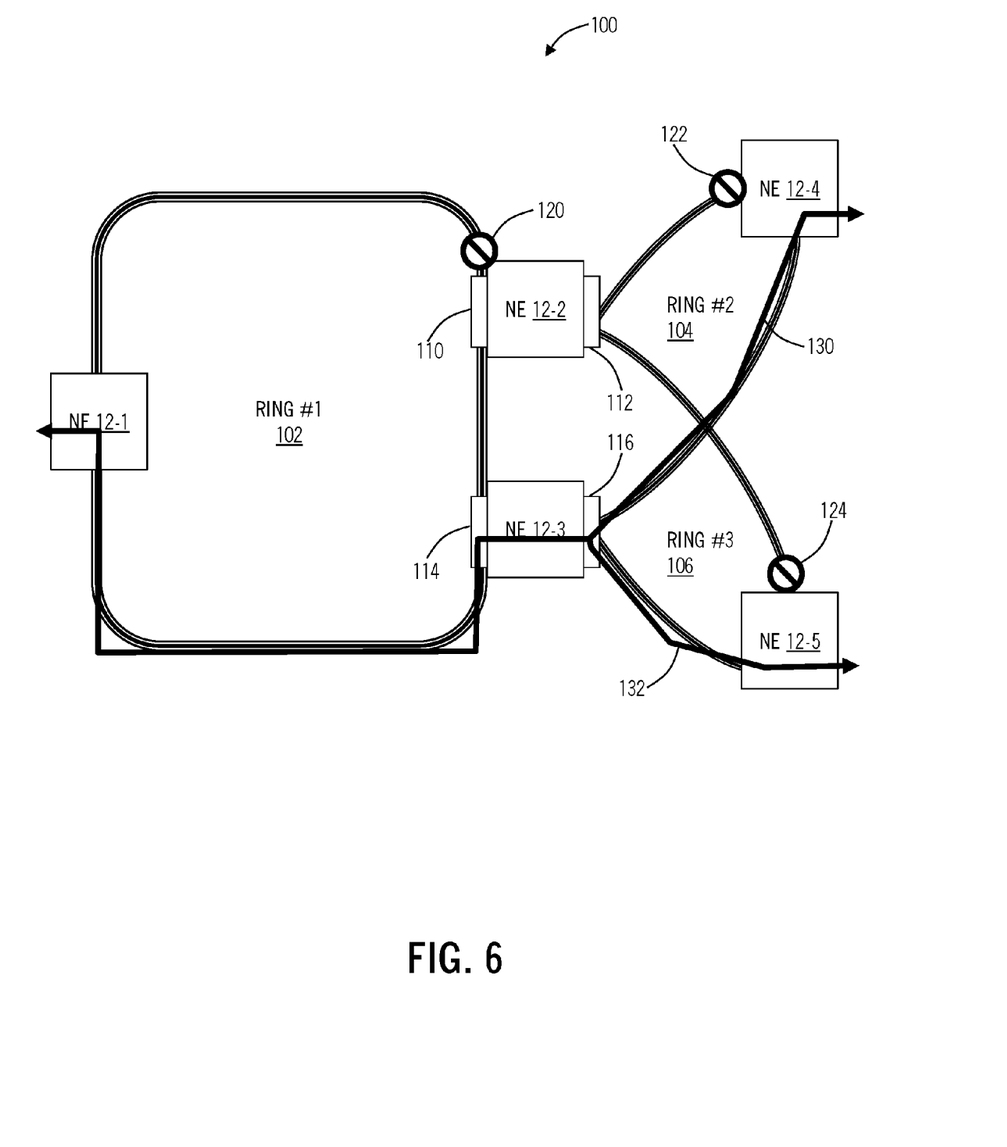
FIG. 6 is a network diagram of an interconnected network of network elements associated with rings providing Ethernet Ring Protection.

Referring to FIG. 6, in an exemplary embodiment, an interconnected network 100 is illustrated of network elements 12-1-12-5 (collectively referred to herein as network elements 12) associated with rings 102, 104, 106 providing Ethernet Ring Protection. The network 100 is shown as an exemplary interconnected network to illustrate the G.8032 multiple concurrent fault recovery mechanisms. Those of ordinary skill in the art will recognize the G.8032 multiple concurrent fault recovery mechanisms are equally applicable to other interconnected network configurations. In this exemplary embodiment, the ring 102 is the major ring, the rings 104, 106 are the sub-rings, and the network elements 12-2, 12-3 are the interconnection nodes. In this exemplary embodiment, the network element 12-2 includes modules 110, 112, and the network element 12-3 includes modules 114, 116. The modules 110, 112, 114, 116 can be referred to as blades, line cards, etc. and are multi-port devices (e.g., 1 GbE, 10 GbE, etc. ports) that physically realize the ring ports in the rings 102, 104, 106. In this exemplary embodiment, the module 110 is a same hardware device forming both east and west ring ports for the network element 12-2 on the ring 102, and the module 114 is a same hardware device forming both east and west ring ports for the network element 12-3 on the ring 102. Conversely, the module 112 forms a ring port for the network element 12-2 on the rings 104, 106 and the module 112 is a separate hardware device from the module 110, and the module 116 forms a ring port for the network element 12-3 on the rings 104, 106 and the module 116 is a separate hardware device from the module 114. This is a commonly deployed configuration in the field.

The interconnected network 100 includes three distinct rings, i.e. the rings 102, 104, 106. The ring 102 includes the network elements 12-1, 12-2, 12-3 and a channel block 120 is located on a port of the module 110 in the network element 12-2 facing the network element 12-1 for the ring 102. The ring 104 includes the network elements 12-1, 12-2, 12-3, 12-4 and a channel block 122 is located on a port of the network element 12-4 facing the network element 12-2. The ring 106 includes the network elements 12-1, 12-2, 12-3, 12-5 and a channel block 124 is located on a port of the network element 12-5 facing the network element 12-2. The channel blocks 120, 122, 124 can also be referred to as RPL blocks. For illustration purposes, FIG. 6 illustrates traffic 130 between the network element 12-1 and the network element 12-4 over the ring 104, and traffic 132 between the network element 12-1 and the network element 12-5 over the ring 106.

Figure 7:
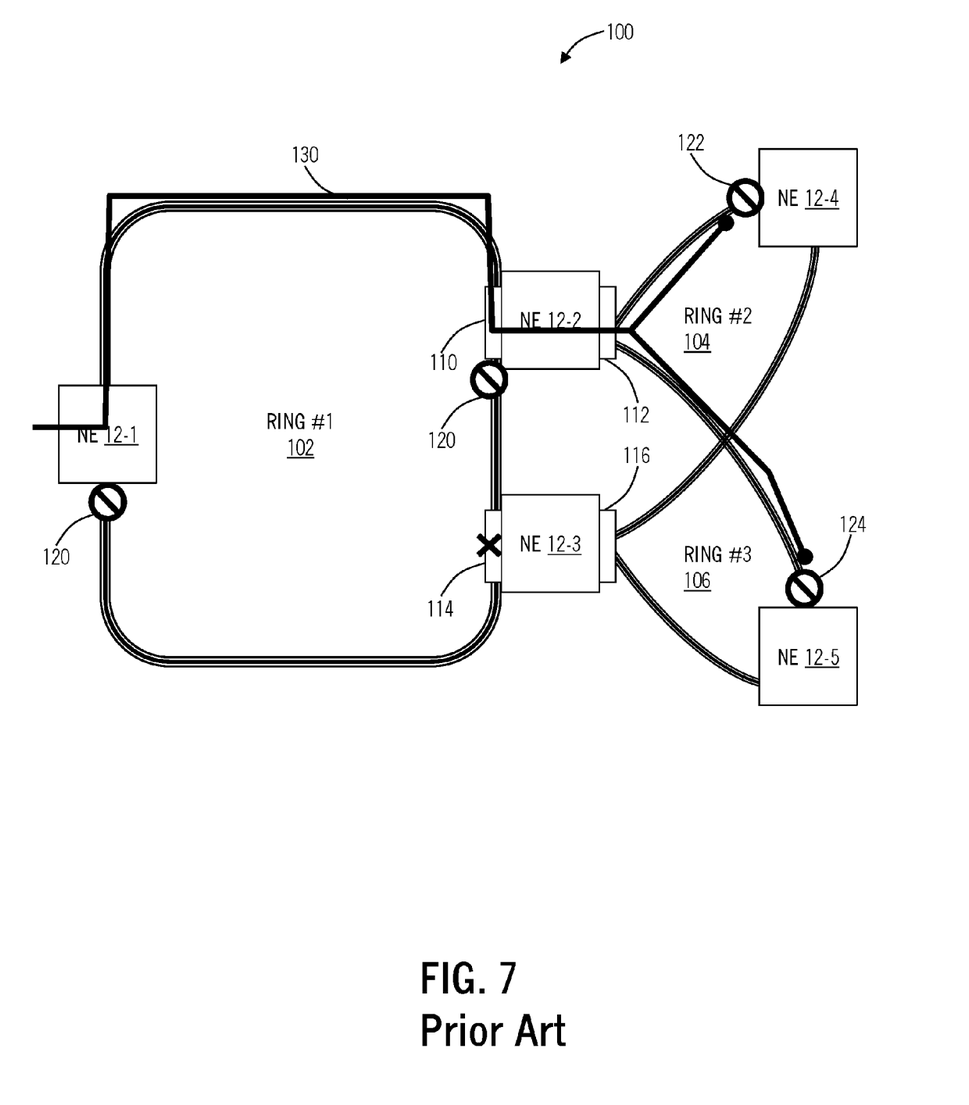
FIG. 7 is a network diagram of the rings of FIG. 6 with a failure of a module on a main ring, i.e. multiple concurrent failures without implementing G.8032 multiple concurrent fault recovery mechanisms.

Referring to FIG. 7, in an exemplary embodiment, the interconnected network 100 is illustrated with a failure of the module 114. FIG. 7 illustrates conventional operation of G.8032 where the failure of the module 114 persistently disrupts the successful delivery of client services to the rings 104, 106. Although G.8032 was specified/defined to provide resiliency for single fault scenarios only, a [single] network element blade (e.g., line module, card) fault can actually result in multiple faults on a ring (e.g., the failure of the module 114 results in failures of the ring 102 east and west port at the network element 12-3). From a technical protocol perspective, this is a multiple failure scenario, however, from a customer perspective this is a single fault scenario. Upon the failure of the module 114, the ring 102 has the block 120 moved to ports of the network elements 12-1, 12-2 facing the ports on the network element 12-3. This causes traffic from the network element 12-1, 12-2 bound for the rings 104, 106 to travel through the network element 12-2 as the interconnection node. Problematically, the rings 104, 106 are not aware of this change and continue to have the blocks 122, 124 in place thereby blocking all traffic from the network element 12-2 to the network elements 12-4, 12-5.

Figure 8:
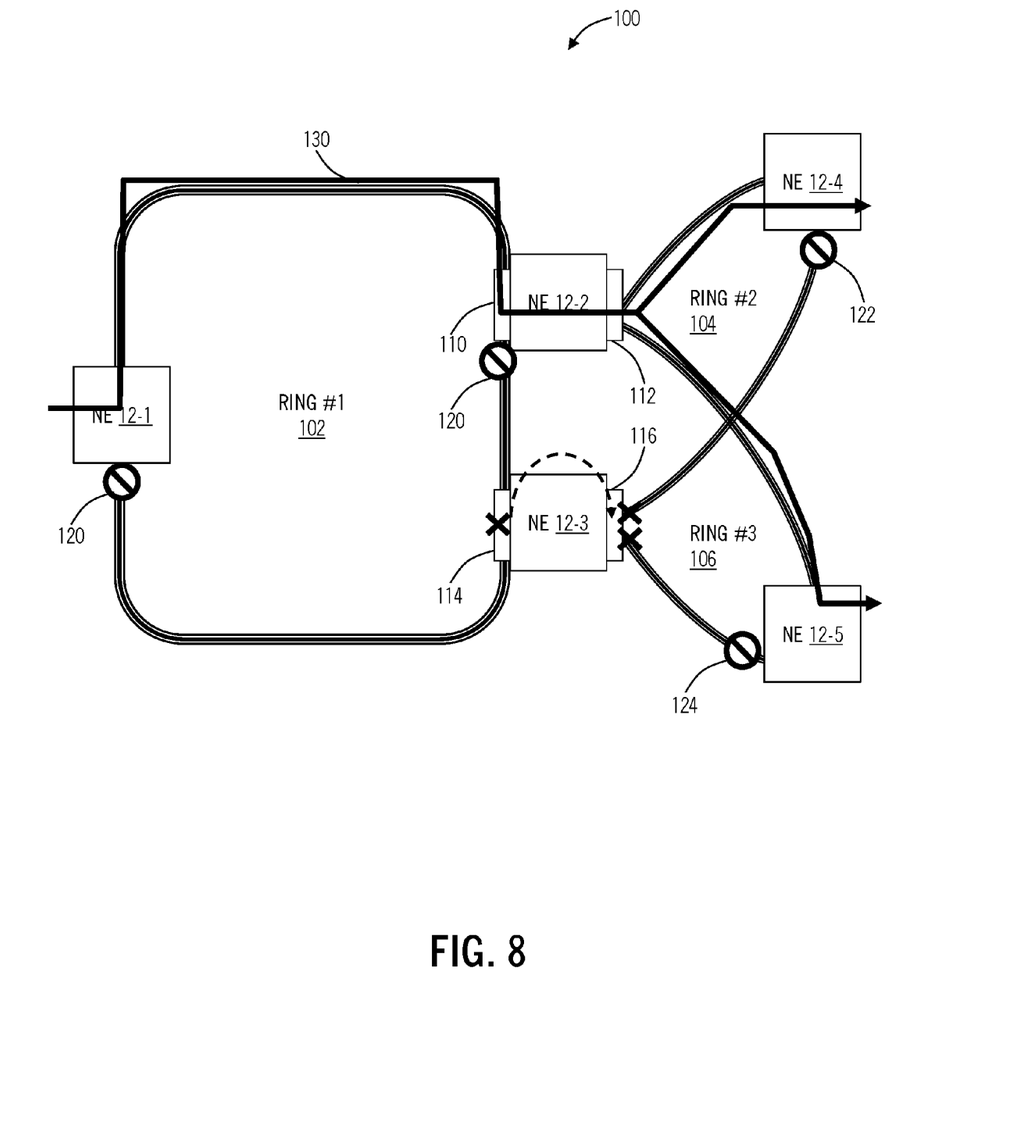
FIG. 8 is a network diagram of the rings of FIG. 6 with the failure of the module as in FIG. 7 and with implementing G.8032 multiple concurrent fault recovery mechanisms.

Referring to FIG. 8, in an exemplary embodiment, the interconnected network 100 is illustrated with a failure of the module 114 and with implementing G.8032 multiple concurrent fault recovery mechanisms. Again, the class of dual concurrent fault scenarios that addressed by the G.8032 multiple concurrent fault recovery mechanisms is applicable to multi-blade (or multi-module) devices were a given ring's (e.g., ring #1) east and west port are on one blade/module, and the sub ring (e.g. ring #2) termination ports are on another blade/module. The G.8032 multiple concurrent fault recovery mechanisms automatically detect/identify ring failures of the aforementioned class, and cause a protection switch over to occur on the interconnecting sub-rings 104, 106 of the ring 102 with the impairment. By doing this, client traffic being transported over the ringed network can be successfully delivered. Specifically, in FIG. 8, responsive to the failure of the module 114, the network element 12-3 causes a block on the module 116 such that the rings 104, 106 see a failure at the associated ports on the module 116. The block is caused through a forced switch or manual switch applied to the sub-ring termination port or administratively disabling the sub-ring termination port. Also, it is possible to cause the block by extending the RAPS signaling protocol to add a new message that informs the sub-rings 104, 106 of blocking this port due to this condition. This could be implemented through G.8032 state machine changes for receiving/sending this message and any associated message/state change actions for clearing it again. Responsive to the block, the ring 104 moves the block 122 to the port on the network element 12-4 facing the network element 12-3 thereby opening up the port facing the network element 12-2. The ring 106 moves the block 124 to the port on the network element 12-5 facing the network element 12-3 thereby opening up the port facing the network element 12-2.

Figure 9:
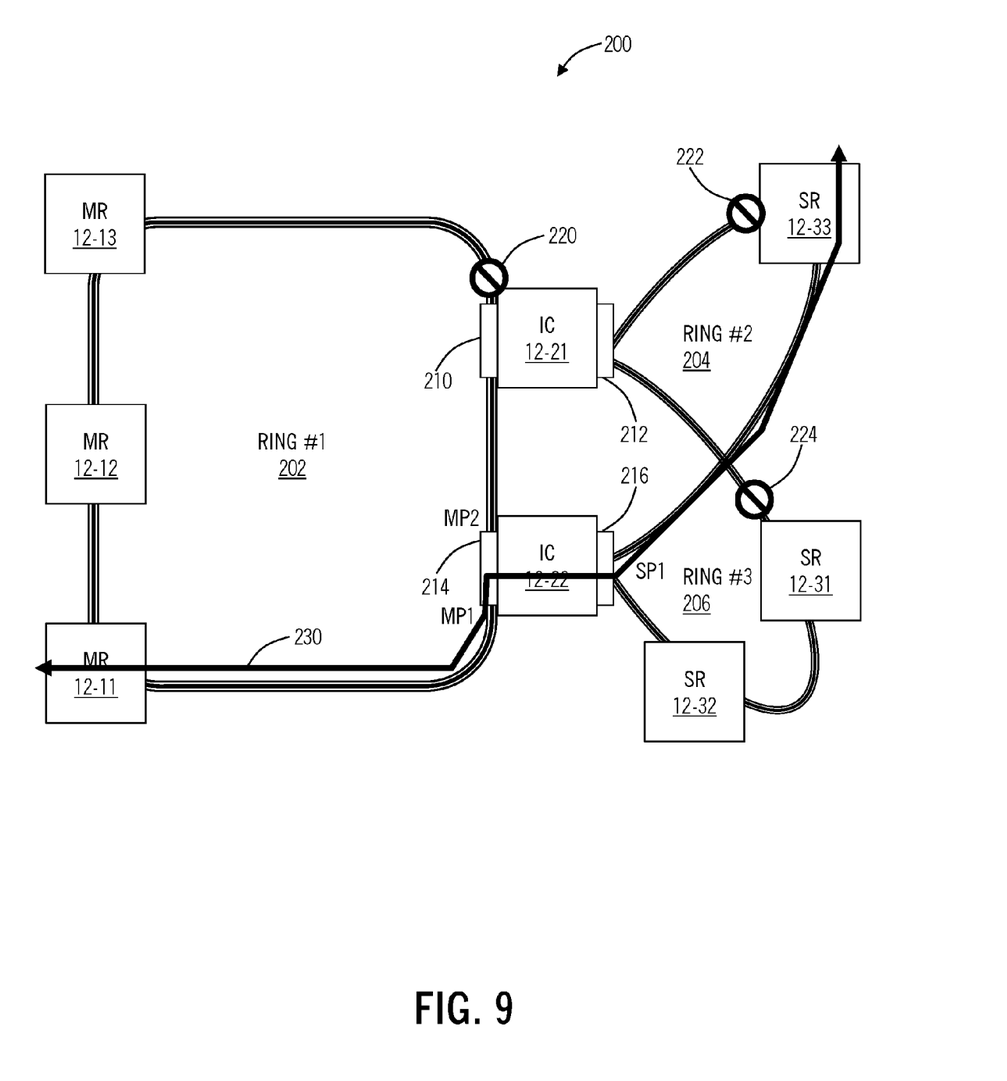
FIG. 9 is a network diagram of an interconnected network of network elements associated with rings providing Ethernet Ring Protection.
Figure 10:
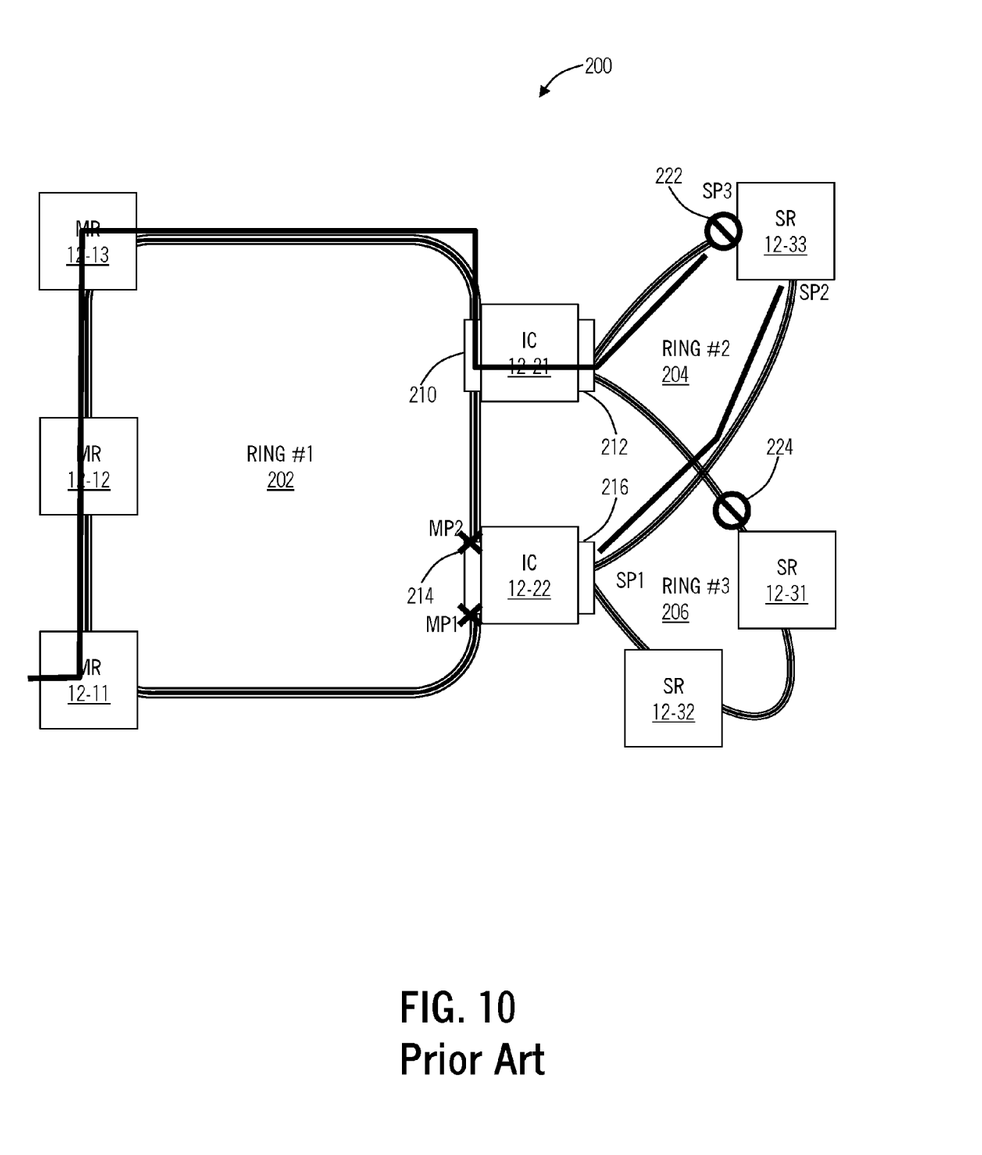
FIG. 10 is a network diagram of the interconnected network of FIG. 9 with a failure affecting both major ring ports without implementing G.8032 multiple concurrent fault recovery mechanisms.

Referring to FIG. 9, in an exemplary embodiment, an interconnected network 200 is illustrated of network elements 12-11-12-33 (collectively referred to herein as network elements 12) associated with rings 202, 204, 206 providing Ethernet Ring Protection. The network 200 is shown as another exemplary interconnected network to illustrate the G.8032 multiple concurrent fault recovery mechanisms. Again, those of ordinary skill in the art will recognize the G.8032 multiple concurrent fault recovery mechanisms are equally applicable to other interconnected network configurations. In this exemplary embodiment, the ring 202 is the major ring, the rings 204, 206 are the sub-rings, and the network elements 12-21, 12-22 are the interconnection nodes (denoted as IC 12-21, 12-22). The network elements 12-11, 12-12, 12-13 are on the major ring 202 (denoted as MR 12-11, 12-12, 12-13) and the network elements 12-31, 12-32, 12-33 are on the sub-rings 204, 206 (denoted as SR 12-31, 12-32, 12-33). Initially, due the location of a block 220 on the major ring 202 being on the IC 12-21, traffic 230 from the MR 12-31 to the sub-ring 204 SR 12-33 is directed towards port MP1 of the IC 12-22. The traffic 230 is then sent via port SP1 to the SR 12-33. Similarly because of a block 222 on the SR 12-33, traffic 230 from the SR 12-33 for the MR 12-31 is directed towards the port SP1 on the IC 12-22. The IC 12-22 includes a module 214 with the ports MP1, MP2, and a module 216 with Referring to FIG. 10, in an exemplary embodiment, the interconnected network 200 is illustrated with a failure affecting both major ring ports MP1, MP2 of the IC 12-22. FIG. 10 illustrates conventional operation of G.8032 where the failure of the major ring ports MP1, MP2 persistently disrupts the successful delivery of client services to the rings 204, 206. Here, a dual port failure occurs on the major ring 202 (i.e., a failure of ports MP1, MP2 on the IC 12-22), and a protection switch is performed by removing the block 220 from the IC 12-21. The traffic 230 from the MR 12-11 to the SR 12-33 will now be directed towards the IC 12-21 and will arrive on port SP3 of the SR 12-33, where it will run into the block 222 for the sub-ring 204 and be dropped. Because there has been no port failure on any of the sub-ring ports SP1, SP2, SP3, the sub-ring 204 has no knowledge of any faults and continue to behave as before, i.e. the SR 12-33 sends its traffic to the MR 12-11 out of the port SP2 and it will arrive at the port SP1 of the IC 12-22 and be dropped because both of the major ring ports MP1, MP2 have failed.

The sub-ring 206 encounters a similar problem; due to the location of a block 224, the SR 12-21, 12-22 both send traffic destined for any of the MR 12-11, 12-12, 12-13 towards the port SP1 of the IC 12-22, and that traffic is dropped because both of the major ring ports MP1, MP2 have failed. Essentially, after the failure occurs on the major ring ports MP1, MP2, all traffic between any of the MR 12-11, 12-12, 12-13 and any of SR 12-31, 12-32, 12-33 would be disrupted.

Figure 11:
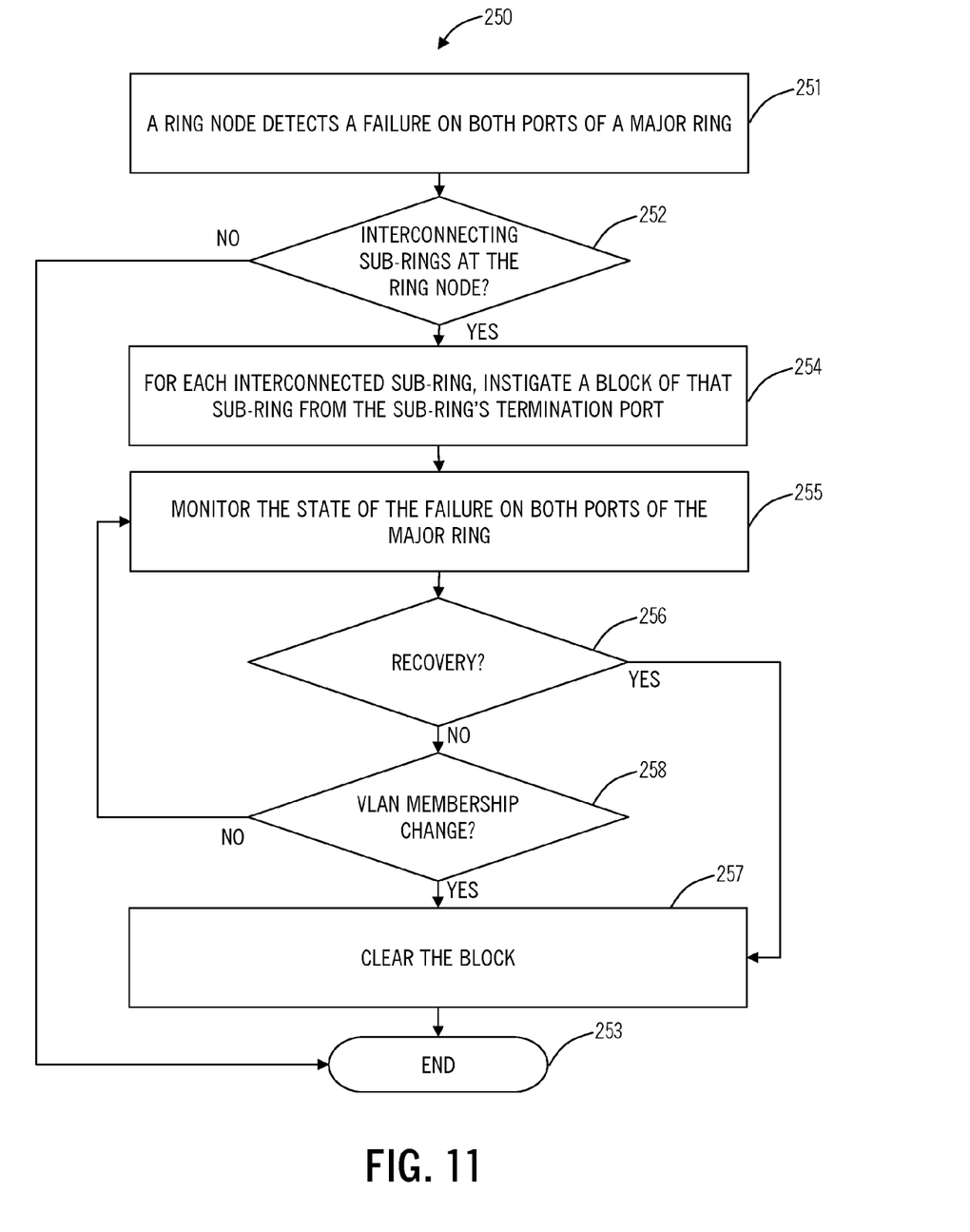
FIG. 11 is a flowchart of a G.8032 multiple concurrent fault recovery method.

Referring to FIG. 11, in an exemplary embodiment, a flowchart concurrent a G.8032 multiple concurrent fault recovery method 250. The G.8032 multiple concurrent fault recovery method 250 contemplates operation on one of the network elements 12, such as the IC 12-21, 12-22. The G.8032 multiple concurrent fault recovery method 250 includes a ring node detecting a failure on both ports of a major ring (step 251). The ring node checks if there are interconnecting sub-rings that it terminates (step 252), and if not, the G.8032 multiple concurrent fault recovery method 250 ends (step 253). Here there is a multiple failure, but it does not affect interconnecting sub-rings and normal G.8032 protection mechanisms can be used. If there are interconnecting sub-rings at the ring node (step 252), the ring node is an interconnection node and for each interconnected sub-ring, the ring node instigates a block of that sub-ring from the sub-ring's termination port (step 254). Again, the block is caused through a forced switch or manual switch applied to the sub-ring termination port or administratively disabling the sub-ring termination port. Also, it is possible to cause the block by extending the RAPS signaling protocol to add a new message that informs the sub-rings 204, 206 of blocking this port due to this condition. This could be implemented through G.8032 state machine changes for receiving/sending this message and any associated message/state change actions for clearing it again.

With the block in place, the interconnecting sub-rings 204, 206 now see the failure due to the failure on both ports of the major ring, and the interconnecting sub-rings implement normal G.8032 protection mechanisms therein. Concurrently, the ring node monitors the state of the failure on both ports of the major ring (step 255). If one or both of the major ring ports recovers (step 256), the ring node clears the block from the sub-ring termination ports (step 257). If VLAN membership of major ring/sub-ring changes such that the two are no longer interconnected (step 258), the ring node clears the block from the sub-ring termination ports (step 257). The G.8032 multiple concurrent fault recovery method 250 ends (step 253) or continues to monitor the state (step 255). Similarly, if VLAN membership of a major-ring/sub-ring changes such that these two become interconnected (when they were previously not sharing any traffic), a check should be made to see if a dual port failure condition on the major ring already exists. If so, then as soon as the VLAN membership change causes the two to become interconnected, the block must be immediately performed on the sub-ring's termination port.

Figure 12:
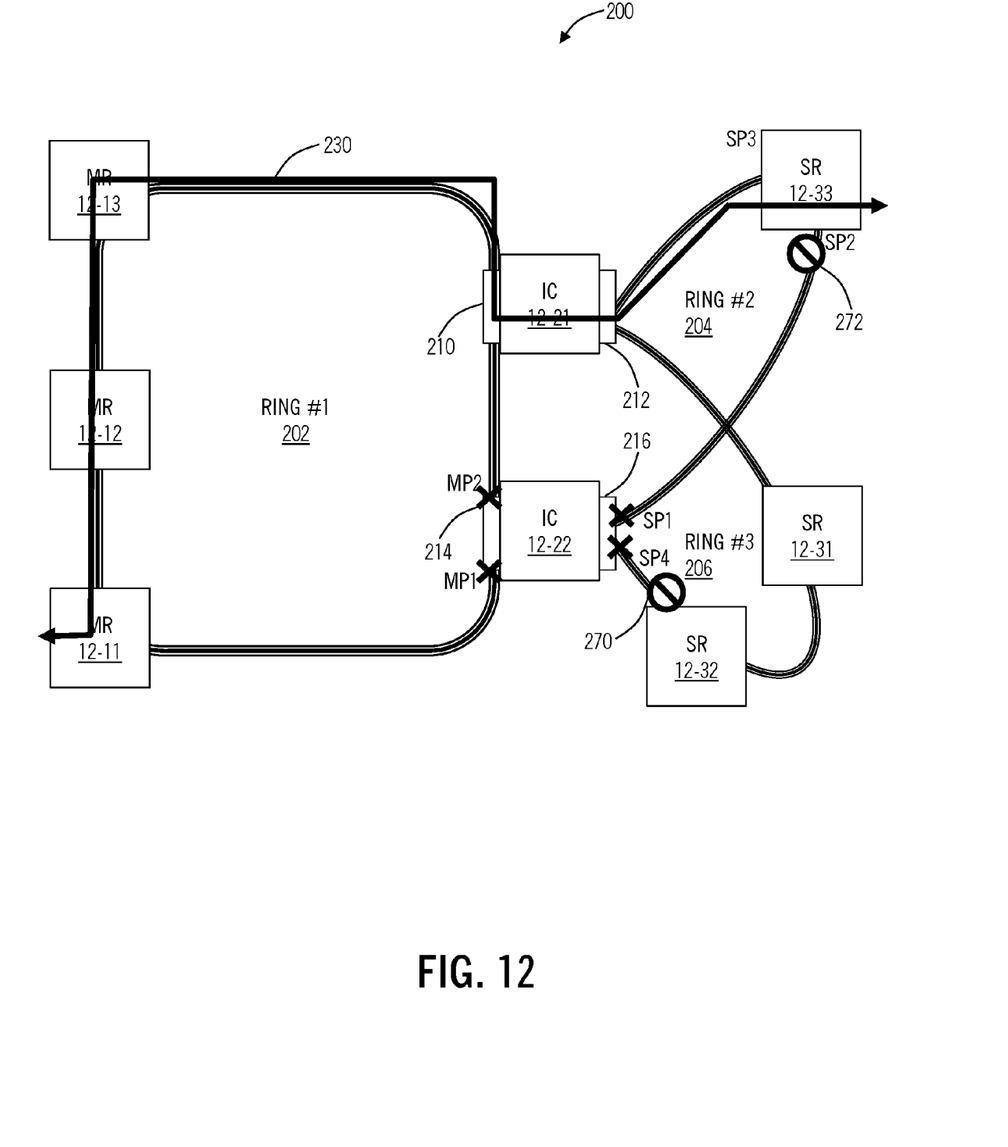
FIG. 12 is a network diagram of the interconnected network of FIG. 9 with a failure of both major ring ports and with implementing G.8032 multiple concurrent fault recovery mechanisms.

Referring to FIG. 12, in an exemplary embodiment, the interconnected network 200 is illustrated with a failure of both major ring ports MP1, MP2 of the IC 12-22 and with implementing the G.8032 multiple concurrent fault recovery method 250. Here, upon the failure of both major ring ports MP1, MP2 of the IC 12-22, the G.8032 multiple concurrent fault recovery method 250 includes the IC 12-22 detecting the failures as well as identifying there are interconnecting sub-rings (i.e., the rings 204, 206) terminating at this network element on ports SP1, SP4 respectively. The IC 12-22 applies a block for the sub-ring 204 on the port SP1, and a block for the sub-ring 206 on the port SP4. Again, the block is caused through a forced switch or manual switch applied to the port or administratively disabling the port.

This forces blocks 270, 272 to ports facing the ports SP1, SP4 respectively (and thereby removing the original RPL blocks 222, 224). The traffic 230 from the MR 12-11 to the SR 12-333 will now go through the IC 12-21 and arrive on SP3 as before, but will now be let through. The block on SP1 will also cause all sub-ring traffic from the SR 12-33 to go out of SP3 to the IC 12-21 and traffic between SR3 and MR1 will be restored. Similarly, the placement of the block on SP4 for the sub-ring 206 will cause all sub-ring traffic to be directed towards the IC 12-21 and restore connectivity to the major ring 202 for the SR 12-31, 12-32. Advantageously, the G.8032 multiple concurrent fault recovery method 250 leverages the existing G.8032 state machine with actions to address a multiple concurrent fault affecting interconnected sub-rings.

Figure 13:
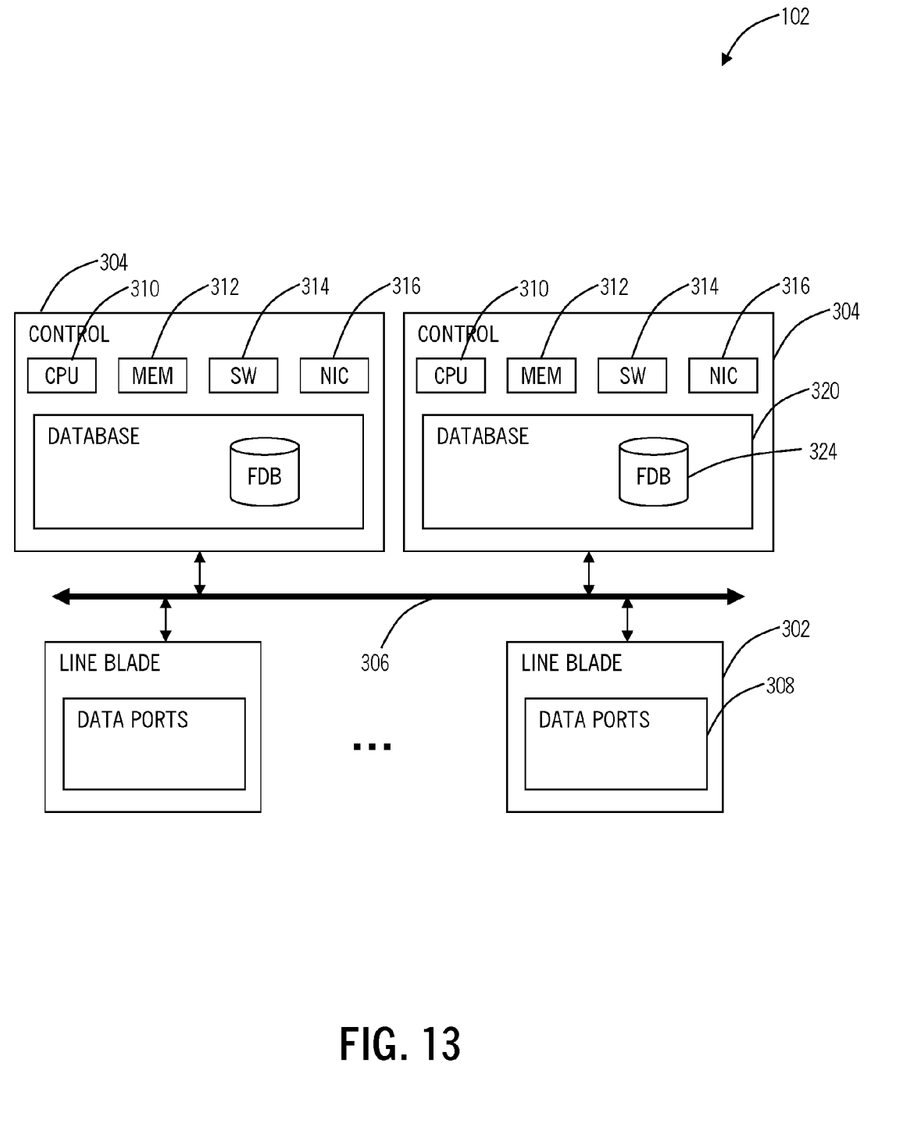
FIG. 13 is a block diagram of an exemplary implementation of a network element for implementing G.8032 multiple concurrent fault recovery mechanisms.

Referring to FIG. 13, in an exemplary embodiment, a block diagram illustrates an exemplary implementation of the network element 12. In this exemplary embodiment, the network element 12 is an Ethernet network switch, but those of ordinary skill in the art will recognize the present invention contemplates other types of network elements and other implementations, such as, for example, a layer two switch integrated within an optical network element. In this exemplary embodiment, the network element 12 includes a plurality of blades 302, 304 interconnected via an interface 306. The blades 302, 304 are also known as line cards, line modules, circuit packs, pluggable modules, etc. and refer generally to components mounted within a chassis, shelf, etc. of a data switching device, i.e. the network element 12. In another exemplary embodiment, the functionality of each of the blades 302, 304 may be integrated within a single module, such as in the layer two switch integrated within an optical network element. Each of the blades 302, 304 may include numerous electronic devices and optical devices mounted on a circuit board along with various interconnects including interfaces to the chassis, shelf, etc. Two exemplary blades are illustrated with line blades 302 and control blades 304. The line blades 302 generally include data ports 308 such as a plurality of Ethernet ports. For example, the line blade 302 may include a plurality of physical ports disposed on an exterior of the blade 302 for receiving ingress/egress connections. Additionally, the line blades 302 may include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the network element 102 out by the correct port 308 to the next network element. "Switching fabric" includes switching units, or individual boxes, in a node; integrated circuits contained in the switching units; and programming that allows switching paths to be controlled.

The control blades 304 include a microprocessor 310, memory 312, software 314, and a network interface 316 to operate within the networks 100, 200. Specifically, the microprocessor 310, the memory 312, and the software 314 may collectively control, configure, provision, monitor, etc. the network element 12. The network interface 316 may be utilized to communicate with an element manager, a network management system, etc. Additionally, the control blades 304 may include a database 320 that tracks and maintains provisioning, configuration, operational data and the like. The database 320 may include a forwarding database (FDB) 322. In this exemplary embodiment, the network element 12 includes two control blades 304 which may operate in a redundant or protected configuration such as 1:1, 1+1, etc. In general, the control blades 304 maintain dynamic system information including Layer two forwarding databases, protocol state machines, and the operational status of the ports 308 within the network element 12. In an exemplary embodiment, the blades 302, 304 are configured to implement G.8032 rings, such as the major ring and/or sub-rings, and to implement the various processes, algorithms, methods, mechanisms, etc. described herein for implementing the G.8032 multiple concurrent fault recovery method 250. For example, a multiple concurrent or simultaneous fault can occur when one of the blades 302 include both east and west ports of a major ring.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, comprising:
    detecting a failure on both ports of a major ring at a network element that has an interconnecting sub-ring terminating thereon, wherein the failure is a single event that simultaneously causes a failure on both ports, and wherein both ports are contained in a same module and the failure affects the same module;
    causing a block at an associated sub-ring termination port of the interconnecting sub-ring responsive to the failure on both the ports of the major ring; and
    monitoring the failure and clearing the block responsive to a recovery of one or both ports from the failure.

2. The method of claim 1, wherein the block causes the failure on the major ring to be visible on the interconnecting sub-ring for implementing G.8032 Ethernet Ring Protection Switching thereon.

3. The method of claim 1, further comprising:
    implementing G.8032 Ethernet Ring Protection Switching in the major ring responsive to the failure.

4. The method of claim 3, further comprising:
    implementing G.8032 protection in the interconnecting sub-ring responsive to the block.

5. The method of claim 1, further comprising:
    monitoring virtual local area network (VLAN) membership between the major ring and interconnecting sub-ring with the block thereon; and
    responsive to a change in the VLAN membership such that the major ring and the interconnecting sub-ring are no longer interconnected, releasing the block.

6. The method of claim 1, further comprising:
    causing the block through one of a forced switch or manual switch applied to the associated sub-ring termination port or administratively disabling the associated sub-ring termination port.

7. A network element, comprising:
    a west major ring port and an east major ring port each associated with a major ring;
    a sub-ring termination port associated with a sub-ring interconnected with the major ring; and
    circuitry configured to:
        detect a failure affecting both the west major ring port and the east major ring port, wherein the failure is a single event that simultaneously causes a failure on both the west major ring port and the east major ring port, and wherein both the west major ring port and the east major ring port are contained in a same module and the failure affects the same module;
        cause a block at the sub-ring termination port; and
        monitor the failure and clear the block responsive to a recovery of one or both of the west major ring port and the east major ring port from the failure.

8. The network element of claim 7, wherein the block causes the failure on the major ring to be visible on the interconnecting sub-ring for implementing G.8032 Ethernet Ring Protection Switching thereon.

9. The network element of claim 7, wherein the circuitry is further configured to:
    implement G.8032 Ethernet Ring Protection Switching in the major ring responsive to the failure.

10. The network element of claim 9, wherein the sub-ring is configured to implement G.8032 Ethernet Ring Protection Switching responsive to the block.

11. The network element of claim 7, wherein the circuitry is further configured to:
    monitor virtual local area network (VLAN) membership between the major ring and interconnecting sub-ring with the block thereon; and
    responsive to a change in the VLAN membership such that the major ring and the interconnecting sub-ring are no longer interconnected, release the block.

12. The network element of claim 7, wherein the network element comprises an interconnection node.

13. The network element of claim 7, wherein the block is caused through one of a forced switch or manual switch applied to the sub-ring termination port or administratively disabling the sub-ring termination port.

14. A network, comprising:
    a major ring comprising a first interconnection node and a second interconnection node; and
    a sub-ring interconnected to the major ring through the first interconnection node and the second interconnection node;
    wherein, responsive to a multiple concurrent failure at one of the first interconnection node and the second interconnection node affecting traffic between the major ring and the sub-ring, the one of the first interconnection node and the second interconnection node is configured to cause a block on a port terminating the sub-ring, wherein the failure is a single event that simultaneously causes the multiple concurrent failure of two ports at a same node, and wherein the two ports are contained in a same module and the failure affects the same module.

15. The network of claim 14, wherein the block causes the multiple concurrent failure on the major ring to be visible on the sub-ring for implementing G.8032 Ethernet Ring Protection Switching thereon.

16. The network of claim 15, wherein, responsive to the multiple concurrent failure, the major ring is configured to implement G.8032 Ethernet Ring Protection Switching.

17. The network of claim 14, wherein, responsive to the multiple concurrent failure and the block, the sub-ring is configured to implement G.8032 Ethernet Ring Protection.

18. The network of claim 14, wherein the one of the first interconnection node and the second interconnection node is configured to:
    monitor virtual local area network (VLAN) membership between the major ring and sub-ring with the block thereon; and
    responsive to a change in the VLAN membership such that the major ring and the sub-ring are no longer interconnected, release the block.

19. The network of claim 14, wherein the block is caused through one of a forced switch or manual switch applied to the port terminating the sub-ring or administratively disabling the port terminating the sub-ring.

* * * * *